United States Patent [19]
Hwang

[11] Patent Number: 5,789,832
[45] Date of Patent: Aug. 4, 1998

[54] ALTERNATOR ROTOR SHAFT

[75] Inventor: Sam-Dong Hwang, Kyongsangbuk-Do, Rep. of Korea

[73] Assignee: Mando Machinery Corporation, Rep. of Korea

[21] Appl. No.: 848,450

[22] Filed: May 8, 1997

Related U.S. Application Data

[63] Continuation of Ser. No. 560,864, Nov. 20, 1995, abandoned.

[30] Foreign Application Priority Data

May 20, 1995 [KR] Rep. of Korea ............... 95-12665

[51] Int. Cl.$^6$ ................................................ H02K 1/04
[52] U.S. Cl. ...................... 310/43; 310/232; 310/263
[58] Field of Search ........................ 310/43, 232, 263, 310/147, 143, 128; D8/360

[56] References Cited

U.S. PATENT DOCUMENTS

| | | | |
|---|---|---|---|
| 4,105,907 | 8/1978 | Hagenlocher et al. | 310/232 |
| 4,419,597 | 12/1983 | Shiga et al. | 310/68 D |
| 4,484,094 | 11/1984 | Ade et al. | 310/43 |
| 4,588,911 | 5/1986 | Gold | 310/62 |
| 4,618,793 | 10/1986 | Shizuka et al. | 310/232 |
| 5,026,253 | 6/1991 | Borger | 415/229 |
| 5,124,608 | 6/1992 | Lawrence et al. | 310/232 |

FOREIGN PATENT DOCUMENTS

| | | | |
|---|---|---|---|
| WO 90/05395 | 5/1990 | Germany | 310/232 |
| 54-82547 | 6/1979 | Japan | 310/43 |

*Primary Examiner*—Thomas M. Dougherty
*Assistant Examiner*—K. Imayoshi Eizo Tumai
*Attorney, Agent, or Firm*—Bryan Cave LLP

[57] ABSTRACT

An improved rotor shaft for an alternator reduces the number of corresponding parts thereof. The rotor shaft includes a reinforced insert embedded within a shaft for preventing buckling, the shaft being molded using an engineering plastic; a threaded portion formed at one end of the shaft; a pulley engaging portion formed at the other end of the shaft; a rear bearing engaging portion inwardly formed from the pulley engaging portion; a spline inwardly formed from the rear bearing engaging portion for tightening the rotor; and a small diameter portion outwardly formed from the threaded portion.

7 Claims, 3 Drawing Sheets

ALTERNATOR ROTOR SHAFT

This is a continuation of U.S. application Ser. No. 08/560,864, filed Nov. 20, 1995 now abandoned.

BACKGROUND OF THE INVENTION

1. Field of the Invention

The present invention relates to a rotor shaft for an alternator, and more particularly to an improved rotor shaft for an alternator capable of reducing the number of parts of the rotor shaft.

2. Description of the Conventional Art

A conventional rotor shaft for an alternator includes a rotor driven by a driving source such as a vehicle engine, and a stator for generating an alternate current in cooperation with the rotor for charging a battery or the like using a regulator.

The rotor of the alternator includes a plurality of bearings provided in a housing, a pulley being driving by the driving source and a slip ring embedded at a peripheral portion of the housing for providing a predetermined electric path.

In more detail, referring to FIG. 1, a pulley "P" is attached to one end of a shaft "A" by an engaging member "F." A serration "S" engaged with a rotor "R" is formed at an intermediate portion of shaft "A". A slip ring having a predetermined diameter "D" is attached to the other end of pulley "P."

This type of rotor shaft requires separate manufacturing processes for the serration, a pulley engaging portion formed at one end of the shaft, and a portion having a smaller diameter formed on the other end of the shaft, which is disadvantageous.

In addition, other parts, such as pulley and a slip ring are also necessary.

Moreover, since the rotor "R" is inserted on the shaft to the serration "S," a buckling variation may occur at the shaft. In order to prevent this problem, product testing processes are disadvantageously required.

Also, since the rotor shaft and the pulley are made of a relatively weighty steel, the shaft is heavier than desired.

To resolve the above-mentioned problems, Japanese Patent Sho 54-82547 entitled "Driving shaft assembly and manufacturing method thereof" discloses a metal sleeve inserted on both ends of a plastic shaft, made of a hollow fiber-reenforced plastic (FRP). This driving shaft, however, was designed for a shaft generally used in a rear-wheel drive vehicle.

A rotor shaft for an alternator cannot utilize the above-mentioned technology because the rotor shaft has a relatively small diameter.

SUMMARY OF THE INVENTION

Accordingly, it is an object of the present invention to provide a rotor shaft for an alternator, which overcomes the problems encountered in conventional alternator rotor shafts.

It is another object of the present invention to provide an alternator rotor shaft with a reduced number of parts.

To achieve the above objects, there is provided an alternator rotor shaft, which includes a reinforced insert embedded within a shaft for preventing a buckling, the shaft molded using an engineering plastic; a threaded portion formed at one end of the shaft; a pulley engaging portion formed at the other end of the shaft; a rear bearing engaging portion inwardly formed from the pulley engaging portion; a spline inwardly formed from the rear bearing engaging portion for tightening the rotor; and a small diameter portion outwardly formed from the threaded portion.

In addition, the pulley engaging portion can integrally engaged with a pulley. The slip rings can be embedded within the shaft when molding the product.

DETAILED DESCRIPTION OF THE INVENTION

Figure 1:
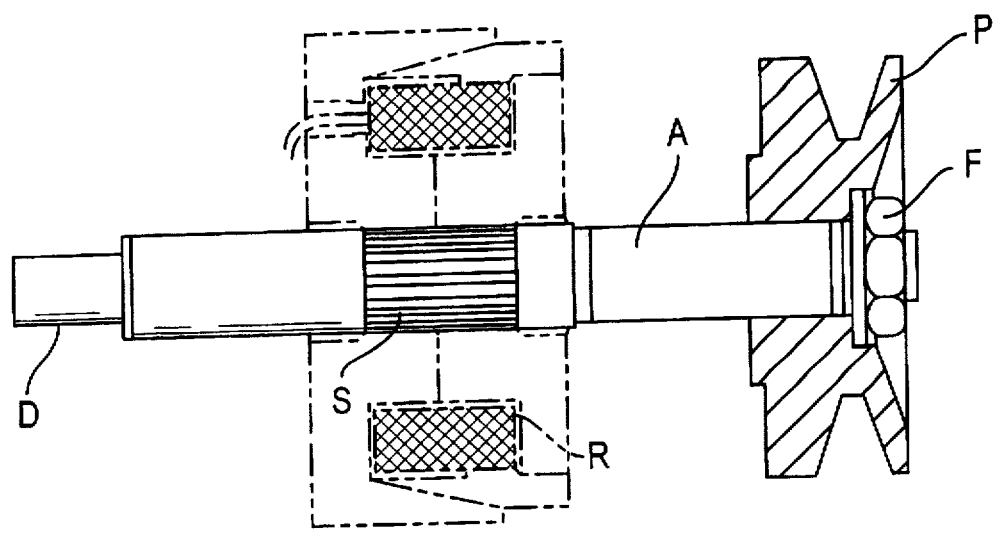
FIG. 1 is a side cross-sectional view showing a conventional rotor shaft for an alternator.
Figure 2:
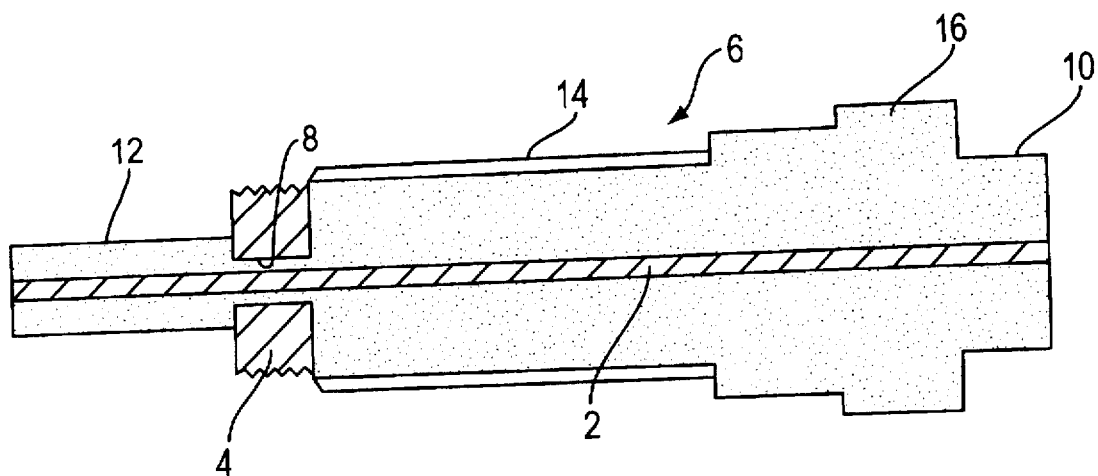
FIG. 2 is a cross-sectional view showing a rotor shaft for an alternator of a first embodiment according to the present invention.

Referring to FIG. 2, the construction of an alternator rotor shaft of a first embodiment according to the present invention will now be explained.

To begin with, a reinforced insert 2 embedded within a shaft 6 shaft includes a threaded portion 4 exposed to the outside of shaft 6. The threaded portion 4 provides a barrier so as to prevent a molten resin from flowing beyond a desired location during molding and to partition shaft 6. In addition, threaded portion 4 includes an opening 8 formed in a direction of the axis of the shaft 6.

The shaft 6 includes a pulley engaging portion 10 formed at one end of the shaft 6 and a small diameter portion 12 disposed at the other end thereof for receiving a slip ring.

The pulley engaging portion 10 generally receives a steel pulley or an engineering plastic pulley and is tightened by a nut or the like.

A rear side bearing engaging portion 16 is formed at the peripheral portion of the pulley engaging portion 10. In addition, a predetermined portion of the small diameter portion 12 is used as a bearing engaging portion.

In this embodiment, the rotor "R" is engaged to the threaded portion 4 engaged with a spline 14 and tightened by a nut "B."

In addition, front and rear bearings Bf and Br of the housing are engaged to the peripheral portion of the small diameter portion 12 and the bearing engaging portion 16, respectively.

Pulley 18 is inserted onto pulley engaging portion 10, and a pair of slip rings 20 are inserted on small diameter portion 12 at a predetermined interval.

An electric connection between the slip rings 20 and the rotor "R" is made in a well known manner.

Figure 3:
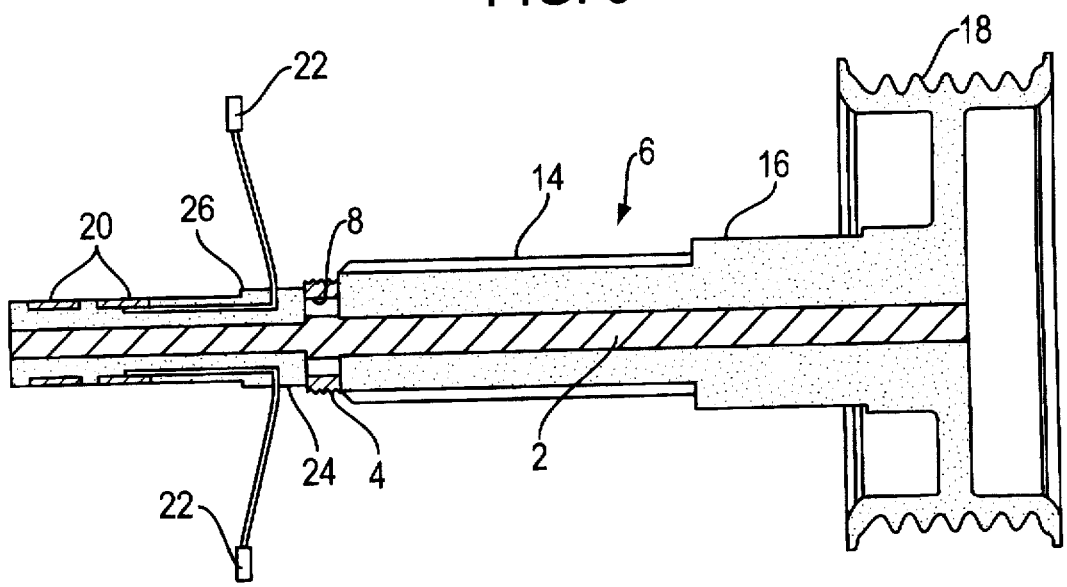
FIG. 3 is a cross-sectional view showing a rotor shaft for an alternator of a second embodiment according to the present invention.
Figure 4:
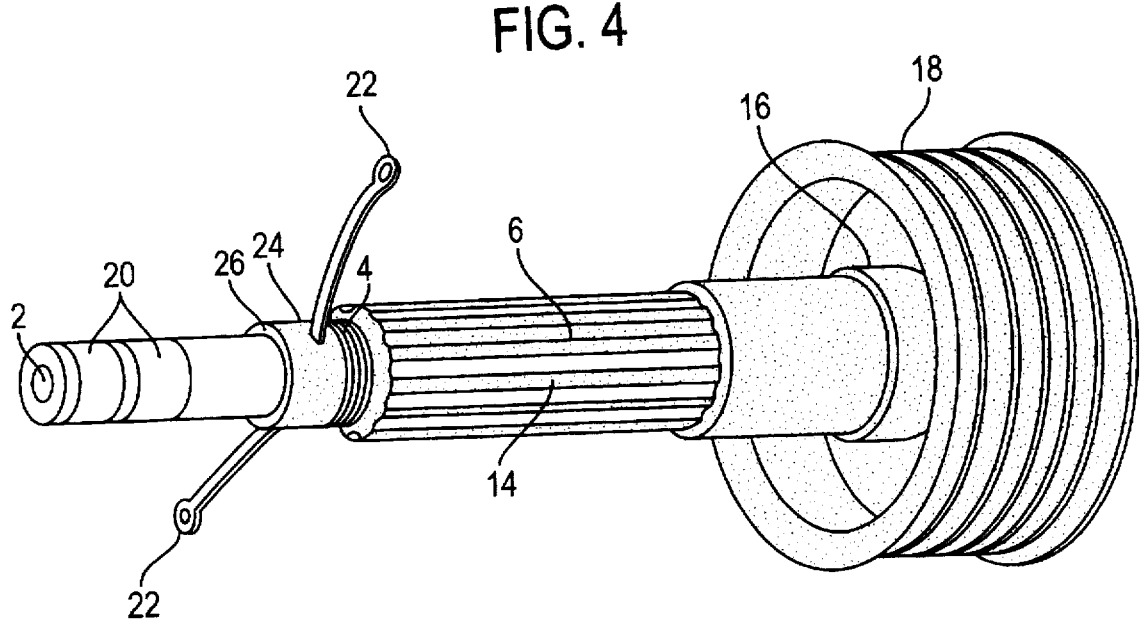
FIG. 4 is a perspective view showing a rotor shaft of FIG. 3 according to the present invention.

Referring to FIG. 3, the construction of an alternator rotor shaft of a second embodiment according to the present invention will now be explained.

A pulley 18 is integrally formed on one end of shaft 6. A pair of spaced-apart slip rings 20 each are embedded on a peripheral portion of the other end of shaft 6.

A terminal 22 outwardly extending from the slip rings 20 is connected to the rotor "R" through the outer portion of a bearing stopper 24 adjacent to threaded portion 4 of reinforced insert 2.

Bearing stopper 24 has a diameter greater than that of the slip rings 20 and includes a recess 26 for limiting the installation location of a front bearing Bf at the outer portion of a small diameter portion 12.

The alternator rotor shaft according to the present invention reduces the number of the assembly processes by eliminating the process for the pulley and slip rings.

In addition, a separate pulley is not necessary, thus advantageously reducing the manufacturing cost of the rotor shaft.

Also, their rotor shaft is lighter because the pulley a separate not necessary in the present invention.

Figure 5:
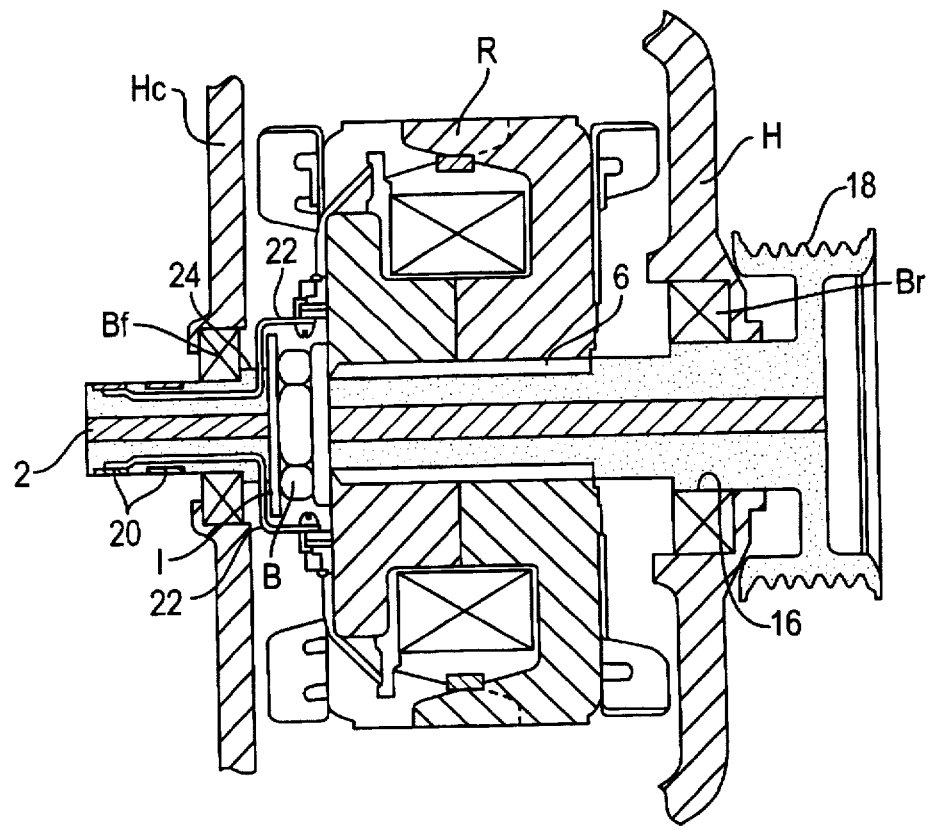
FIG. 5 is a side cross-sectional view showing an alternator according to the present invention.

FIG. 5 shows a rotor shaft of FIG. 3 in an alternator.

As shown therein, a rear bearing Br of a housing "H" is inserted to the bearing engaging portion 16 on one end of the shaft 6, the rotor "R" is engaged to spline 14, and a washer and an engaging bolt "B" are attached to the threaded portion 4 of the reinforced insert 2.

Thereafter, an insulating ring "T" is inserted, and both terminals 22 are connected to the rotor "R," and the front bearing Bf of housing cover Hc is inserted past slip rings 20 and fixed by the bearing stopper 24.

As described above, the rotor shaft according to the present invention is constructed by molding the outer surface of the rotor shaft, which is made of an engineering plastic, after embedding a reinforced insert within the rotor shaft, thus increasing strength of the shaft, which achieves a lighter weight.

Use of the present invention can reduce gasoline consumption and improve the strength of the rotor shaft and also prevent a buckling also prevent during assembly which may occur the process, thereby advantageously eliminating shaft inspection for straightness.

In addition, when the a shaft and pulley are integral, a much lighter rotor shaft can be achieved because an additional pulley is not required.

Moreover, when the slip rings are embedded within one end portion of the shaft, the assembly is improved.

What is claimed is:

1. An alternator rotor shaft comprising:

a shaft molded using an engineering plastic;

a reinforced insert embedded within the shaft for preventing buckling of the shaft:

a pully integrally molded with the shaft at one end of the shaft for facilitating rotation of the shaft;

splines integrally formed on the shaft for enabling a rotor to be mounted on the shaft in fixed rotational relationship thereto; and a threaded element longitudinally aligned with the shaft, the threaded element located intermediate of the shaft and adjacent to one end of the splines for facilitating securing the rotor on the splines, the threaded element having a hollow interior, the shaft being molded around the threaded element with the shaft extending through the hollow interior.

2. An alternator rotor shaft which comprises:

a shaft molded using an engineering plastic;

a reinforced insert embedded within the shaft for preventing buckling of the shaft;

splines integrally formed on the shaft for enabling a rotor to be mounted on the shaft in fixed rotational relationship thereto; and a threaded element longitudinally aligned with the shaft, the threaded element located intermediate of the shaft and adjacent to one end of the splines for facilitating securing the rotor on the splines, the threaded element having a hollow interior, the shaft being molded around the threaded element with the shaft extending through the hollow interior.

3. The alternator rotor shaft according to claim 2 further comprising:

a pulley integrally molded with or attached to one end of the shaft for facilitating rotation of the shaft.

4. The alternator rotor shaft according to claim 3 wherein the other end of the shaft has a reduced diameter, and further comprising at least one slip ring disposed on the reduced diameter end of the shaft.

5. The alternator rotor shaft according to claim 4 wherein the at least one slip ring is embedded in an outer surface of the shaft.

6. The alternator rotor shaft according to claim 5 wherein the at least one slip ring comprises an electrical lead having one end connected to the slip ring and a second end, the electrical lead being at least partially embedded in the molded shaft, the second end extending from the shaft.

7. The alternator rotor shaft according to claim 3 wherein the other end of the shaft has a reduced diameter, the rotor shaft further comprising:

at least one slip ring disposed on the reduced diameter end of the shaft; and a bearing stopper formed on the shaft between the threaded element and the reduced diameter portion.

* * * * *